United States Patent
Shiohama et al.

(10) Patent No.: US 9,522,846 B2
(45) Date of Patent: Dec. 20, 2016

(54) MAGNESIA CARBON BRICK

(71) Applicant: KROSAKIHARIMA CORPORATION, Fukuoka (JP)

(72) Inventors: Michiharu Shiohama, Fukuoka (JP); Masato Tanaka, Fukuoka (JP); Yoshinori Matsuo, Fukuoka (JP); Jouki Yoshitomi, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 0 days.

(21) Appl. No.: 14/763,905

(22) PCT Filed: Jan. 29, 2014

(86) PCT No.: PCT/JP2014/051900
§ 371 (c)(1),
(2) Date: Jul. 28, 2015

(87) PCT Pub. No.: WO2014/119593
PCT Pub. Date: Aug. 7, 2014

(65) Prior Publication Data
US 2015/0368159 A1    Dec. 24, 2015

(30) Foreign Application Priority Data

Jan. 31, 2013  (JP) ................................. 2013-017153
Mar. 6, 2013   (JP) ................................. 2013-044450

(51) Int. Cl.
C04B 35/52   (2006.01)
C04B 35/043  (2006.01)

(52) U.S. Cl.
CPC ... *C04B 35/0435* (2013.01); *C04B 2235/3205* (2013.01); *C04B 2235/3821* (2013.01); *C04B 2235/402* (2013.01); *C04B 2235/425* (2013.01); *C04B 2235/428* (2013.01); *C04B 2235/5427* (2013.01); *C04B 2235/5436* (2013.01); *C04B 2235/5472* (2013.01); *C04B 2235/652* (2013.01); *C04B 2235/6567* (2013.01); *C04B 2235/77* (2013.01); *C04B 2235/9692* (2013.01)

(58) Field of Classification Search
CPC ......... C04B 35/03; C04B 35/04; C04B 35/043
USPC ....................................................... 501/101
See application file for complete search history.

(56) References Cited

U.S. PATENT DOCUMENTS

| | | | | |
|---|---|---|---|---|
| 8,030,235 B2 * | 10/2011 | Miglani | ................. | B22D 41/02 501/108 |
| 8,093,169 B2 * | 1/2012 | Tanaka | ................. | C04B 35/013 266/283 |
| 2010/0092750 A1 * | 4/2010 | Tanaka | ................. | F27D 1/0006 428/220 |

FOREIGN PATENT DOCUMENTS

| | | |
|---|---|---|
| JP | 58-208173 | 12/1983 |
| JP | 60-264358 | 12/1985 |
| JP | H01-270564 | 10/1989 |
| JP | 8-259340 | 10/1996 |
| JP | 2007-76980 | 3/2007 |
| JP | 2007-297246 | 11/2007 |
| JP | 2008-151425 | 7/2008 |
| JP | 2010-105891 | 5/2010 |
| JP | 2011-184217 | 9/2011 |

OTHER PUBLICATIONS

International Preliminary Report on Patentability dated Aug. 4, 2015 for PCT/JP2014/51900.
Written Opinion dated Jul. 31, 2015 for PCT/JP2014/51900.
English translation of Koichi Shimizu, "Influence of Boron Compound Addition on the Properties of MgO-C Bricks", Jan. 1, 2013, vol. 65, No. 1, pp. 24-25.
Fuminori Hirose, "Influence of Distribution of Al Additive on Properties of MgO-C Refractories", Refractories, Jul. 1, 2010 (vol. 62, No. 7, pp. 339 to 345.
Koichi Shimizu, "Kakushu Hoso Kagobutsu ga MgO-C Renga no Hinshitsu Tokusei ni Oyobosu Eikyo", Refractories, Jan. 1, 2013, vol. 65, No. 1, pp. 24-25.
International Search Report dated Apr. 1, 2014 for PCT/JP2014/051900, filed Jan. 29, 2014.

* cited by examiner

*Primary Examiner* — Noah Wiese
(74) *Attorney, Agent, or Firm* — Paul D. Bianco; Katherine Davis; Fleit Gibbons Gutman Bongini & Bianco PL

(57) ABSTRACT

In the present invention, the attempt was made to increase the denseness (to lower the porosity) of a magnesia carbon brick furthermore thereby providing the magnesia carbon brick having a high durability never found in the past. The magnesia carbon brick of the present invention comprises a magnesia raw material and a graphite, wherein the magnesia carbon brick contains the graphite with the amount thereof in the range of 8% or more by mass and 25% or less by mass and the magnesia raw material with the amount thereof in the range of 75% or more by mass and 92% or less by mass, the both amounts being relative to the total amount of the magnesia raw material and the graphite; as a grain size distribution of the magnesia raw material, the magnesia raw material having particle diameter of in the range of 0.075 mm or more and 1 mm or less is blended with the amount thereof being 35% or more by mass relative to the total amount of the magnesia raw material and the graphite, and a mass ratio of the magnesia raw material having the particle diameter of in the range of 0.075 mm or more and 1 mm or less to the magnesia raw material having the particle diameter of less than 0.075 mm is 4.2 or more; and an apparent porosity thereof after firing in reducing atmosphere for 3 hours at 1400° C. is 7.8% or less.

14 Claims, No Drawings

MAGNESIA CARBON BRICK

TECHNICAL FIELD

The present invention relates to a magnesia carbon brick to be used suitably as a lining material of a furnace to cover the whole of transportation, storage, refining, and the like of a molten metal.

BACKGROUND ART

A magnesia carbon brick (hereunder, this is called as "MgO—C brick") is a brick comprising magnesia and graphite as main aggregates and having excellent corrosion resistance and spall resistance, whereby it is widely used as a lining material of the whole of furnaces including a converter.

As the operation condition of a refining vessel is becoming increasingly severer in recent years, an MgO—C brick having more enhanced durability has been required. As a barometer of the durability of the Mg—O brick, the oxidation resistance and the corrosion resistance may be mentioned. In order to enhance these characteristics, making the MgO—C brick denser whereby lowering the air permeability with the outside air and suppressing penetration of slag and molten iron is effective. In the past, in order to make the MgO—C brick structure denser, attempts including improvement of the blending recipe thereof and introduction of a high power vacuum pressing machine have been made whereby achieving significantly low porosity thereof; and at the same time, it was confirmed that the durability thereof could be improved thereby significantly contributing to reduction of the unit consumptions of the refractories.

On the other hand, the evaluation technology of the MgO—C brick has been improved. In the past, mainly the characteristics have been evaluated after the MgO—C brick is dried, whereas recently the characteristics are evaluated after it is reductively fired. According to this, even if the apparent porosity is 3% or less after drying, it can occasionally reach 10%, or even higher after the reductive firing at 1400° C. for 3 hours, whereby the approximating value can be obtained to that of the brick after used. That is, the state approximating more actual use state of the sample can be obtained if the sample is reductively fired in advance as compared with otherwise, so that this can be judged effective as the improvement index of the material.

It has been known that the denseness of the MgO—C brick changes with the difference in the grain size distribution of the magnesia raw material; and for example, Patent Document 1 proposes the dense MgO—C brick whose oxidation resistance, corrosion resistance, and thermal strength can be improved by containing therein 30 to 45% by weight of the medium-sized particles having the size of 1 to 0.2 mm and 15 to 25% by weight of the fine particles having the size of 0.2 mm or less.

In addition, Patent Document 2 proposes the highly durable MgO—C brick whose structure deterioration can be suppressed so that the corrosion resistance thereof at the early stage in operation can be kept. This Patent Document 2 points out, as the factor of the structure deterioration of the MgO—C brick, the oxidation and reduction reactions between the magnesia and the carbon caused by the heat which is received in operation; and as the measure for improvement thereof, reduction of the amount of fine powders of the magnesia in the raw material mixture is proposed.

CITATION LIST

Patent Document

Patent Document 1: Japanese Patent Laid-Open Publication No. H01-270564
Patent Document 2: Japanese Patent Laid-Open Publication No. 2007-297246

SUMMARY OF THE INVENTION

Problems to be Solved by the Invention

The intention in Patent Document 1 to make the MgO—C brick dense by increasing the amount of the medium-sized particles is as same as that of the present invention. However, in Patent Document 1, because there is no study made with regard to the amount of the fine particles of magnesia, if there are too much amount of the fine particles, the distance between the magnesia particles becomes too close so that the sintering takes place to raise the modulus of elasticity thereof; and as a result, there has been a problem of deterioration of the spall resistance. Moreover, the grain size distribution of the magnesia raw material can have a significant effect on the filling property in shaping, and it is necessary to study the effects of the blending amount of the graphite and the particle diameter thereof. Therefore, there has been a left problem for further improvement.

Moreover, with regard to Patent Document 2, as the factor of the structure deterioration of the MgO—C brick, not only the oxidation and reduction reactions, but also, for example, the space which is formed by the expansion and shrinkage of the magnesia needs to be considered, so that only to specify the amount of the fine particles of the magnesia is insufficient. Therefore, there has been a left problem for further improvement.

In view of the situation mentioned above, the problem to be solved by the present invention is to further enhance the denseness of the MgO—C brick (to lower the porosity thereof) thereby providing the MgO—C brick having a high durability never found in the past.

Means for Solving the Problems

The present invention could be completed by new findings that in addition to optimization of the grain size distribution of the magnesia raw material which occupies most of the specific surface area of the raw material composition of the MgO—C brick, optimization of the grain size distribution of the graphite is an important factors to achieve lowering of the porosity of the MgO—C brick; in other words, in addition to optimization of the grain size distribution of the magnesia raw material and by optimizing the grain size distribution of the graphite, further lowering of the porosity of the MgO—C brick after the heat load could be achieved; and as a result of it, it became possible to provide the MgO—C brick having a high durability never found in the past.

Namely, the present invention provides the MgO—C brick as shown below.

(1) A magnesia carbon brick, comprising a magnesia raw material and a graphite, wherein the magnesia carbon brick contains the graphite with amount thereof in the range of 8% or more by mass and 25% or less by mass and the magnesia raw material with amount thereof in the range of 75% or more by mass and 92% or less by mass, the both amounts being relative to total amount of the magnesia raw material and the graphite; as a grain size distribution of the magnesia raw material, the magnesia raw material having particle diameter of in the range of 0.075 mm or more and 1 mm or less is blended with amount thereof being 35% or more by mass relative to total amount of the magnesia raw material and the graphite, and a mass ratio of the magnesia raw material having particle diameter of in the range of 0.075 mm or more and 1 mm or less to the magnesia raw material having particle diameter of less than 0.075 mm is 4.2 or more; and an apparent porosity thereof after reductive firing for 3 hours at 1400° C. is 7.8% or less.

(2) The magnesia carbon brick according to (1), wherein as the grain size distribution of the magnesia raw material, the magnesia raw material having particle diameter of in the range of 0.075 mm or more and 1 mm or less is blended with amount thereof being 43% or more by mass relative to total amount of the magnesia raw material and the graphite, and the mass ratio of the magnesia raw material having particle diameter of in the range of 0.075 mm or more and 1 mm or less to the magnesia raw material having particle diameter of less than 0.075 mm is 4.2 or more.

(3) The magnesia carbon brick according to (1) or (2), wherein as a grain size distribution of the graphite, the graphite having particle diameter of 0.15 mm or more is blended with amount thereof being 40% or more by mass relative to total amount of the graphite.

(4) The magnesia carbon brick according to any one of (1) to (3), wherein amount of a pitch-based raw material is less than 1% by mass in outer percentage relative to total amount of the magnesia raw material and the graphite.

(5) The magnesia carbon brick according to any one of (1) to (4), wherein the magnesia carbon brick contains a metal Al containing 85% or more by mass of particles having particle diameter of 75 µm or less with amount thereof in the range of 1% or more by mass and 15% or less by mass relative to addition amount of the graphite, and boron carbide containing 85% or more by mass of particles having particle diameter of 45 µm or less with amount thereof in the range of 1% or more by mass and 50% or less by mass relative to addition amount of the metal Al.

In the past, there also have been several examples in which the apparent porosity was measured by reductive firing the MgO—C brick; however, in most of them, the firing temperature had been 1200° C. or lower, and therefore, there has been no example in which the low porosity of 7.8% or less could be achieved at the high thermal load of 1400° C. Inventors of the present invention found that by further lowering the apparent porosity of the MgO—C brick after treatment at the high thermal load to 7.8% or less, the corrosion resistance and the oxidation resistance could be enhanced to the level never found in the past. This could be achieved by the ways and effects as shown below.

To enhance the filling property after shaping is effective for further lowering of the porosity after a high thermal load; however, when the fine particles of the magnesia raw material having the particle diameter of less than 0.075 mm are contained too much, the chance of contact among the particles of the magnesia raw material by themselves increases thereby lowering the filling property; and thus, it is preferable that the amount thereof be made smaller. In addition, the distance between the magnesia particles becomes too close in the matrix of the MgO—C brick; and as a result, the sintering takes place readily. This tendency becomes more eminent when the blending amount of the graphite is small.

Inventors of the present invention found that in order to suppress this sintering, to control the blending amount of the fine particles having the particle diameter of less than 0.075 mm in a certain low level in the grain size distribution of the magnesia raw material whereby inhibiting the distance between the particles from becoming too close was effective; and then, the optimum blending ratio (mass ratio) of the fine particles having the particle diameter of less than 0.075 mm was specified.

In addition, the magnesia raw material expands and shrinks during the heating-up process and the cooling-down process, respectively; and because the expansion rate thereof is larger than that of the graphite, spaces are formed around its during shrinkage. Because the comparatively large spaces are formed around the coarse particle having the particle diameter of more than 1 mm, the spaces readily become an open pore, thereby leading to significant increase in the apparent porosity. Accordingly, it is preferable that the blending amount of the coarse particles having the particle diameter of more than 1 mm be made smaller and the blending amount of the medium-sized particles having the particle diameter of in the range of 0.075 mm or more and 1 mm or less be made larger. Specifically, the blending amount of the medium-sized particles is preferably 35% or more by mass, or more preferably 43% or more by mass relative to the total amount of the magnesia raw material and the graphite.

On the other hand, with regard to the grain size distribution of the graphite, as the amount of the particles having the particle diameter of 0.15 mm or more increases, the linear change rate after the heat-treatment becomes lower, so that the apparent porosity after a high thermal load becomes lower. For example, in the case when shaping is made by a mono-axial press by using the flake graphite, the graphite is orientated in the brick structure whereby the magnesia particles with smaller particle diameter than that of the graphite are enclosed by the graphite. Because the graphite is flexible, it is difficult to form the spaces by expansion and shrinkage during the heating-up and cooling-down processes around the magnesia particles enclosed by the graphite.

For the reason as mentioned above, the apparent porosity of the MgO—C brick can be lowered by making the grain size distribution of the graphite such that the large graphite having the particle diameter of 0.15 mm or more may be blended more, and also by optimizing the grain size distribution of the magnesia raw material as mentioned above.

As to the binder for the MgO—C brick, a phenolic resin is generally used; and in this case, it is more preferable that the addition amount thereof be made smaller. This is because evaporation of a solvent during the heating process and of volatile matters formed by the polycondensation reaction can be reduced, and also because a so-called loophole, through which evaporated matters can escape outside the system, facilitates open-pore generation. To decrease the blending amount of the magnesia raw material having the particle diameter of less than 0.075 mm and to enlarge the particle diameter of the graphite can bring about reduction in the specific surface area of the entirety of the raw material composition, thereby realizing to reduce the necessary addition amount of the binder.

In addition, the present invention is characterized by that in the MgO—C brick containing the magnesia raw material and the graphite contained therein, by controlling the particle diameter and content of the metal Al to constitute the brick structure, and also by controlling the particle diameter and content of the boron carbide, deterioration of the structure by exposure to the thermal history during a long period of time can be suppressed so that the denseness can be maintained.

Hereunder, composition of the present invention will be explained in detail.

As to the firing temperature at the time of evaluation of the apparent porosity of the MgO—C brick, 1400° C. is decided. The temperature lower than this temperature is not suitable for evaluation of the denseness, because not only the reaction inside the MgO—C brick cannot be completed, but also the thermal load is insufficient. On the other hand, at the temperature higher than this temperature, the sintering takes place, so that not only the evaluation separately from this effect becomes difficult, but also the load to the firing furnace becomes too large; and thus, this temperature is inappropriate for the regular measurement evaluation. As to the firing period at 1400° C. of the exposure temperature of the sample, the period of 3 hours is decided. The period of less than 3 hours is inappropriate because the reaction inside the MgO—C brick cannot be completed. On the other hand, if the firing is made for a longer period than this period, the sintering thereof takes place, so that the evaluation separately from this effect becomes difficult. The present invention is characterized by that the apparent porosity is suppressed at 7.8% or less, which is measured by the Archimedes method (JIS R 2205) using kerosene as the medium for it by using the sample obtained after firing at 1400° C. for 3 hours under the reducing atmosphere.

To the MgO—C brick of the present invention, the metal Al can be added; and in this case, the addition amount of the metal Al is appropriate in the range of 1% or more by mass and 15% or less by mass relative to the addition amount of the graphite. By keeping the addition amount at a comparatively low level as mentioned above, the expansion can be suppressed and the pores formed by evaporation of the metal Al can be controlled; and as a result, the MgO—C brick can be made dense. The reason why the addition amount thereof is 1% or more by mass is that the addition amount less than this value is insufficient in the oxidation resistance. A further enhanced effect thereof can be obtained when the fine metal Al having the particle diameter of 75 µm or less is used.

Boron carbide is used to suppress the deterioration of the brick structure during a long period of a thermal history. The mechanism thereof is presumed to be as follows.

The temperatures to form reaction products of the metal Al are about 800° C. for $Al_4C_3$ and about 900° C. for $Al_2O_3$. On the other hand, the oxidation on-set temperature of the boron carbide is about 500° C.; and under co-existence of the boron carbide and the metal Al, $Al_4BC$ starts to be produced at 400 to 500° C. $B_2O_3$, which is produced by oxidation of the boron carbide, reacts with $Al_2O_3$ to form the liquid phase which is a mixture of $9Al_2O_3 \cdot 2B_2O_3$, $2Al_2O_3 \cdot B_2O_3$, $Al_2O_3$, and $B_2O_3$. From these, by containing the boron carbide in the MgO—C brick added with the metal Al, formation of $Al_2O_3$, which causes formation of the spinel with the magnesia, can be suppressed from lower temperature. Moreover, because compounds of the $Al_2O_3$—$B_2O_3$ types having low melting temperatures are formed, content of $Al_2O_3$ in the brick can be reduced. With this, the spinel reaction between $Al_2O_3$ and the magnesia can be suppressed; and as a result, it is presumed that expansion of the brick can be suppressed. Moreover, because the liquid phase which is a mixture of $9Al_2O_3 \cdot 2B_2O_3$, $2Al_2O_3 \cdot B_2O_3$, $Al_2O_3$, and $B_2O_3$ acts as an anti-oxidant film at high temperature, deterioration of the oxidation resistance of the MgO—C brick by decreasing the amount of the metal Al may be suppressed, or the oxidation resistance thereof may be enhanced.

The addition amount of the born carbide is appropriate in the range of 1% or more by mass and 50% or less by mass, or more preferably 25% or less by mass, relative to addition amount of the metal Al. If the addition amount of the born carbide is more than 50% by mass, $B_2O_3$ is produced excessively by oxidation when it is exposed to the thermal history, whereby the excessive $B_2O_3$ not reacted with $Al_2O_3$ reacts with the magnesia raw material to produce a large amount of low-melting products; and as a result, it causes deterioration of the corrosion resistance. If the addition amount of the born carbide is less than 1% by mass, the effect thereof cannot be obtained. In addition, the effect of the boron carbide can be clearly obtained when the boron carbide containing 85% or more by mass of the particles having the particle diameter of 45 µm or less is used. Meanwhile, a commercially available boron carbide which is generally used for refractories may be used.

To the MgO—C brick of the present invention, the metal Si can also be added; and in this case, the addition amount thereof is sufficient even if it is minute with the amount thereof being 5% or less by mass relative to the addition amount of the graphite. A further enhanced effect thereof can be obtained when the fine metal Si having the particle diameter of 45 µm or less is used. Excessive addition amount more than this value increases the amount of low-melting products in the MgO—C brick, leading to deterioration of the corrosion resistance whereby leading to deterioration of its durability.

The magnesia raw material to be used in the MgO—C brick of the present invention may be any of fused magnesia and sintered magnesia, or a mixture of them for use. The composition thereof is not particularly restricted; however, in order to obtain a further higher corrosion resistance, it is preferable to use the magnesia having a high purity MgO; and thus, the MgO purity is preferably 96% or more, or more preferably 98% or more.

As to the graphite, usual flake graphite may be used; however, in place of this, or together with this, expanded graphite, artificial graphite, Kish graphite, and the like may be used. The composition thereof is not particularly restricted; however, in order to obtain a further higher corrosion resistance, it is preferable to use the graphite having a high C purity, so that the C purity thereof is preferably 85% or higher, or more preferably 98% or higher. As to the particle diameter, if it is extremely fine, preservation of the denseness is difficult, so that it is preferable to use the graphite having the particle diameter of 0.15 mm or more with the amount thereof being 40% or more by mass based on the entirety of the graphite.

Moreover, in order to improve various properties, other metals such as Mg, Ca, Cr, and Zr, or a metal alloy of two or more of these elements, or a compound of them with B and C may be added. In the present invention, although the addition effect of them is not damaged, if these are added with an excessive amount, there is an adverse effect such as deterioration of the denseness; and thus, similarly to the case of metal Al, the addition amount thereof is preferably 15% or less by mass relative to the addition amount of the graphite.

As to the phenolic resin to be used as the binder, any of a novolak type, a resol type, and a mixture of them may be used; however, a novolak type is more preferable because it does not readily cause the temporal change in the MgO—C brick. It can be used in any state, i.e., a powder state, a solution state where the resin is dissolved in an appropriate solvent, and a mixed state of the solution and powder states, wherein a curing agent such as hexamethylene tetramine is usually added with an appropriate amount to secure the residual carbon rate. It is preferable that the residual carbon rate thereof is 34% or more, or more preferably 48% or more, although the residual carbon rate is not necessarily limited to these values. By using the resin having a high residual carbon rate, the volatile matters during the heating-up process can be reduced; and therefore, it is considered that reduction of the open pores contributes to enhancement of the denseness of the MgO—C brick.

Besides them, in order to mainly compensate the spall resistance, it is effective to use various pitches, carbon black, and pitch-based raw material such as the powders thereof treated with dispersion, pulverization, or the like. However, because these contain volatile matters, the porosity tends to become higher if it is added with an excessive amount. In addition, if the addition amount thereof is increased, the filling property of the MgO—C brick becomes deteriorated and the spring back after shaping increases; and thus, the denseness thereof tends to be deteriorated. Accordingly, the addition amount of the pitch-based raw material is, as the total amount of the C components, preferably less than 1.0% by mass in outer percentage relative to the total amount of the magnesia raw material and the graphite, or more preferably less than 0.6% by mass, although not necessarily limited to this value.

Besides, in order to mainly compensate the spall resistance, carbon black in the type of monocyte and/or aggregate, or the powders thereof treated with dispersion, pulverization, or the like, may be used. However, this can also deteriorate the denseness if it is added with an excessive amount; and thus, the addition amount thereof is preferably 1.5% or less by mass relative to the total amount of the C components.

In manufacturing of the MgO—C brick of the present invention, kinds of a kneader, a shaping machine, and a dryer are not restricted, nor is the content of manufacturing thereof. However, in order to obtain the dense MgO—C brick, it is preferable to knead the added raw materials by using a kneader capable of dispersing and kneading them sufficiently well. The pressing pressure is preferably about 120 MPa or more, or more preferably 150 MPa or more. The drying temperature needs to be higher than a boiling point of a solvent for the binder; however, the temperature is preferably 400° C. or lower in order to avoid oxidation.

Advantageous Effects of Invention

The dense MgO—C brick, namely the MgO—C brick having a low porosity obtained in the way as mentioned above, is excellent in the corrosion resistance; and thus, it can be used suitably in every parts of the converter, a slag line part of the steel ladle, and a secondary refining vessel, wherein it can contribute to expansion of the furnace life and reduction of the unit consumptions of the refractories.

In addition, in the brick added with the proper amount of metal Al and boron carbide, loose of the brick structure due to the expansion of the metal Al which is added thereto as the antioxidant can be suppressed; and therefore, even if it is used under exposure to the thermal history for a long time during its use in the operation, deterioration of the brick structure can be made small and the denseness thereof can be maintained, so that durability of the brick can be improved thereby contributing to extension of the furnace life. Owing to this, the maintenance frequency of the furnace can be decreased, which contributes to reduction in the unit consumptions of the refractories and to enhancement of the productivity because the time span for maintenance of the furnace can be made longer.

DESCRIPTION OF THE EMBODIMENTS

Hereunder, modes for carrying out the present invention will be explained on the basis of Examples. Meanwhile, the present invention is not limited to these Examples.

EXAMPLES

Examples A

The sample was prepared by using the production line for a converter manufacturing. The raw materials were weighed in accordance with the ratios shown in Tables 1 to 3. Kneading was performed by using a high speed type mixer, and shaping in the standard form for a wall with the length of 810 mm was done by the vacuum friction press with the maximum pressure of 180 MPa. Drying was done by keeping it in a batch furnace at the maximum temperature of 280° C. for 5 hours.

TABLE 1

| Example No (Ex. No.) | | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Fused magnesia | More than 1 mm | 44 | 36 | 31 | 26 | 36 | 38 | 36 | 36 | 36 | 49 |
| | 1 to 0.075 mm | 35 | 43 | 48 | 53 | 47 | 49 | 43 | 43 | 43 | 35 |
| | Less than 0.075 mm | 8 | 8 | 8 | 8 | 4 | 0 | 8 | 8 | 8 | 8 |
| Medium-sized particle mass ratio (1 to 0.075 mm) | | 4.4 | 5.4 | 6.0 | 6.6 | 11.8 | ∞ | 5.4 | 5.4 | 5.4 | 4.4 |
| Flake graphite | −0.15 mm | 7 | 7 | 7 | 7 | 7 | 7 | 9 | 3 | | 4 |
| | +0.15 mm | 6 | 6 | 6 | 6 | 6 | 6 | 4 | 10 | 13 | 4 |
| Ratio of +0.15 mm graphite | | 46 | 46 | 46 | 46 | 46 | 46 | 31 | 77 | 100 | 50 |
| Metal Al | 75 μm | 1.0 | 1.0 | 1.0 | 1.0 | 1.0 | 1.0 | 1.0 | 1.0 | 1.0 | 0.6 |
| Ratio of metal Al to addition amount of graphite | | 7.7 | 7.7 | 7.7 | 7.7 | 7.7 | 7.7 | 7.7 | 7.7 | 7.7 | 7.5 |

TABLE 1-continued

| | | | | | | | | | | |
|---|---|---|---|---|---|---|---|---|---|---|
| Metal Si | 45 μm | 0.2 | 0.2 | 0.2 | 0.2 | 0.2 | 0.2 | 0.2 | 0.2 | 0.2 | |
| Ratio of metal Si to addition amount of graphite | | 1.5 | 1.5 | 1.5 | 1.5 | 1.5 | 1.5 | 1.5 | 1.5 | 1.5 | |
| B4C | | 0.1 | 0.1 | 0.1 | 0.1 | 0.1 | 0.1 | 0.1 | 0.1 | 0.1 | 0.1 |
| Phenolic resin | Residual carbon rate 34% | ○ | ○ | ○ | ○ | ○ | ○ | ○ | ○ | ○ | ○ |
| | Residual carbon rate 48% | | | | | | | | | | |
| Pitch | | 0.5 | 0.5 | 0.5 | 0.5 | 0.5 | 0.5 | 0.5 | 0.5 | 0.5 | 0.5 |
| Density after shaping | | 3.05 | 3.06 | 3.07 | 3.07 | 3.10 | 3.10 | 3.06 | 3.10 | 3.10 | 3.14 |
| Apparent porosity (%) | After firing at 1400° C. for 3 hours | 7.8 | 7.4 | 6.5 | 6.5 | 7.0 | 7.8 | 7.2 | 6.5 | 6.0 | 7.8 |
| Corrosion resistance (index) | | 101 | 107 | 124 | 115 | 112 | 101 | 107 | 122 | 134 | 101 |

| Example No (Ex. No.) | | Ex. 11 | Ex. 12 | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|---|---|---|
| Fused magnesia | More than 1 mm | 34 | 32 | 49 | 36 | 36 | 36 | 36 | 36 | 36 | 36 | 36 |
| | 1 to 0.075 mm | 41 | 36 | 35 | 43 | 43 | 43 | 43 | 43 | 43 | 43 | 43 |
| | Less than 0.075 mm | 7 | 7 | 8 | 8 | 8 | 8 | 8 | 8 | 8 | 8 | 8 |
| | | 5.9 | 5.1 | 4.4 | 5.4 | 5.4 | 5.4 | 5.4 | 5.4 | 5.4 | 5.4 | 5.4 |
| Flake graphite | −0.15 mm | 10 | 15 | 4 | | 7 | 7 | 7 | 7 | 7 | 7 | 7 |
| | +0.15 mm | 8 | 10 | 4 | 13 | 6 | 6 | 6 | 6 | 6 | 6 | 6 |
| Ratio of +0.15 mm graphite | | 44 | 40 | 50 | 100 | 46 | 46 | 46 | 46 | 46 | 46 | 46 |
| Metal Al | 75 μm | 1.4 | 2.0 | 0.6 | 1.0 | 1.0 | 2.0 | 1.0 | 1.0 | 1.0 | 1.0 | 1.0 |
| Ratio of metal Al to addition amount of graphite | | 7.8 | 8.0 | 7.5 | 7.7 | 7.7 | 15.4 | 7.7 | 7.7 | 7.7 | 7.7 | 7.7 |
| Metal Si | 45 μm | 0.2 | 0.2 | 0.2 | 0.2 | 0.6 | 0.2 | 0.2 | 0.2 | 0.2 | 0.2 | 0.2 |
| Ratio of metal Si to addition amount of graphite | | 1.1 | 0.8 | 2.5 | 1.5 | 4.6 | 1.5 | 1.5 | 1.5 | 1.5 | 1.5 | 1.5 |
| B4C | | 0.2 | 0.2 | 0.1 | 0.1 | 0.1 | 0.1 | 1.3 | 0.1 | 0.1 | 0.1 | 0.1 |
| Phenolic resin | Residual carbon rate 30% | | | | | | | | | | | ○ |
| | Residual carbon rate 34% | ○ | ○ | ○ | | ○ | ○ | ○ | ○ | ○ | ○ | |
| | Residual carbon rate 48% | | | | ○ | | | | | | | |
| Pitch | | 0.5 | 0.5 | 0.5 | 0.5 | 0.5 | 0.5 | 0.5 | 0.9 | 0.2 | 0 | 2 |
| Density after shaping | | 2.98 | 2.90 | 3.14 | 3.10 | 3.05 | 3.06 | 3.05 | 3.06 | 3.06 | 3.06 | 3.07 |
| Apparent porosity (%) | After firing at 1400° C. for 3 hours | 7.2 | 7.6 | 7.3 | 5.8 | 6.3 | 7.6 | 7.6 | 7.7 | 7.2 | 7.0 | 7.0 |
| Corrosion resistance (index) | | 110 | 104 | 108 | 136 | 102 | 104 | 101 | 104 | 110 | 114 | 110 |

TABLE 2

| | | Comparative Example No (C. Ex. No.) | | | | |
|---|---|---|---|---|---|---|
| | | C. Ex. 1 | C. Ex. 2 | C. Ex. 3 | C. Ex. 4 | C. Ex. 5 |
| Fused magnesia | More than 1 mm | 43 | 45 | 50 | 31 | 50 |
| | 1 to 0.075 mm | 35 | 34 | 35 | 36 | 15 |
| | Less than 0.075 mm | 9 | 8 | 8 | 7 | 20 |

TABLE 2-continued

|  |  | Comparative Example No (C. Ex. No.) | | | | |
| --- | --- | --- | --- | --- | --- | --- |
|  |  | C. Ex. 1 | C. Ex. 2 | C. Ex. 3 | C. Ex. 4 | C. Ex. 5 |
| Medium-sized particle mass ratio (1 to 0.075 mm) | | 3.9 | 4.3 | 4.4 | 5.1 | 0.8 |
| Flake graphite | −0.15 mm | 7 | 7 | 4 | 16 | 15 |
|  | +0.15 mm | 6 | 6 | 3 | 10 | 0 |
|  | Ratio of +0.15 mm graphite | 46 | 46 | 43 | 38 | 0 |
| Metal Al | 75 μm | 1.0 | 1.0 | 1.0 | 1.0 | 3.0 |
|  | Ratio of metal Al to addition amount of graphite | 7.7 | 7.7 | 14.3 | 3.8 | 20.0 |
| Metal Si | 45 μm | 0.2 | 0.2 | 0.2 | 0.2 | 1 |
|  | Ratio of metal Si to addition amount of graphite | 1.5 | 1.5 | 2.9 | 0.8 | 6.7 |
|  | B4C | 0.1 | 0.1 | 0.1 | 0.1 | 0 |
| Phenolic resin | Residual carbon rate 34% | ○ | ○ | ○ | ○ | ○ |
|  | Residual carbon rate 48% | | | | | |
|  | Pitch | 0.5 | 0.5 | 0.5 | 0.5 | 0.5 |
|  | Density after shaping | 3.04 | 3.05 | 3.14 | 2.88 | 2.91 |
| Apparent porosity (%) | After firing at 1400° C. for 3 hours | 7.9 | 8.0 | 8.2 | 7.9 | 10.8 |
|  | Corrosion resistance (index) | 100 | 99 | 98 | 98 | 81 |

From these, the sample for measurement of the physical properties was cut out; and then, the tests were performed. For measurement of the apparent porosity, the samples in the size of 60×60×60 mm were heated in cokes breeze up to 1400° C. in an electric furnace; and then, they were kept there for 3 hours and cooled. Thereafter, the measurement was made in accordance with JIS R 2205 by using kerosene as the medium for the measurement.

The corrosion resistance was evaluated by the rotary corrosion test. At the rotary corrosion test, inside the cylinder having a horizontal rotation axis, the lining was made with the testing brick; and then, it was heated by the oxygen-propane burner, and the surface of the brick was corroded by charging the slag. The testing temperature of 1700° C. and the testing time of 5 hours were employed with the slag composition of $CaO/SiO_2$=3.4, FeO=20%, and MgO=3%; and discharge and charge of the slag were repeated in every 30 minutes. After completion of the test, the dimension of the central part of each brick was measured to calculate the corrosion amount; and this is shown by the corrosion resistance index by taking the corrosion amount of Comparative Example 1 shown in Table 2 as 100. In this corrosion resistance index, when the value is larger, it means higher corrosion resistance.

In Example 1, in the MgO—C brick with the blending amount of the graphite being 13% by mass (this amount refers to the ratio to the total amount of the magnesia raw material and the graphite—the same is applied hereunder), when the blending amount of the medium-sized particles of the magnesia raw material having the particle diameter of in the range of 0.075 mm or more and 1 mm or less was made to 35% by mass while the mass ratio of the medium-sized particles of the magnesia raw material having the particle diameter of in the range of 0.075 mm or more and 1 mm or less to the fine particles of the magnesia raw material having the particle diameter of less than 0.075 mm, namely [mass of the magnesia raw material having the particle diameter of in the range of 0.075 mm or more and 1 mm or less]/[mass of the magnesia raw material having the particle diameter of less than 0.075 mm] (hereunder this ratio is called as "medium-sized particle mass ratio"), was made to 4.4, the apparent porosity of 7.8% could be achieved.

On the contrary, in Comparative Example 1, the medium-sized particle mass ratio was made to less than 4.2 thereby increasing the amount of the fine particles; and as a result, the density after shaping was decreased, thereby leading to increase in the apparent porosity.

In Comparative Example 2, because the blending amount of the medium-sized particles of the magnesia raw material having the particle diameter of in the range of 0.075 mm or more and 1 mm or less was made to less than 35% by mass, the apparent porosity became higher.

Examples 2 to 4 show that the apparent porosity becomes lower when the blending amount of the medium-sized particles of the magnesia raw material having the particle diameter of in the range of 0.075 mm or more and 1 mm or less is increased. In Example 5, the physical properties were studied when the amount of the fine particles having the particle diameter of less than 0.075 mm was made small whereby raising the medium-sized particle mass ratio especially high. In this case, the shapability was excellent and the density after shaping was high, so that the apparent porosity of 7.8% or less could be achieved. Example 6 shows the example in which the amount of the fine particles having the particle diameter of less than 0.075 mm was made to zero; in this example, too, the apparent porosity of 7.8% or less could be achieved.

In Examples 7 to 9, the effects of the particle diameter (grain size distribution) of the graphite were studied. When the blending amount of the particles having the particle diameter of 0.15 mm or more was increased, even though the density after shaping in these Examples were the same, formation of the pores after the heat-treatment could be suppressed, suggesting that to use more amount of the graphite having a larger particle diameter is more preferable. Lowering effect of the apparent porosity was also recognized when the particles having the particle diameter of 0.15 mm or more were blended with the amount thereof being 40% or more by mass.

In Examples 10 to 12, the blending amount of the graphite was changed. In all of them, the apparent porosity was low and the excellent physical properties could be confirmed. On the other hand, in Comparative Example 3, the blending amount of the graphite was made to less than 8% by mass, leading to the result of the higher apparent porosity. It is presumed that because the ratio of the graphite in the matrix was decreased, the expansion of the magnesia raw material was not absorbed enough.

In Example 13, effects of the addition of the metal Si were studied. It was confirmed that when comparing with Example 10, the lowering effect of the apparent porosity can be obtained with the addition of the minute amount thereof.

Example 14 is the example in which the phenolic resin having a high residual carbon rate was used. When comparing with Example 9, apparent porosity was lowered.

Example 15 is the example in which more amount of the metal Si was added as compared with Example 2; and in this case, the apparent porosity was low and excellent. Example 16 is the example in which more amount of the metal Al was added as compared with Example 2; and in this case, the apparent porosity becomes higher. Example 17 is the example in which more amount of $B_4C$ was added as compared with Example 2; and in this case, the apparent porosity becomes, showing that the corrosion resistance is deteriorated because products having low-melting points were formed.

In Comparative Example 5, the MgO—C brick that was investigated extensively in the past is shown; and in this case, the apparent porosity was very high thereby showing the poor result in the corrosion resistance.

In Example 18, the addition amount of the pitch was increased to 0.9% by mass from Example 2; and in this case, sufficient improving effects could be obtained even though the apparent porosity became somewhat higher whereby deteriorating the corrosion resistance. In Examples 19 and 20, the addition amounts of the pitch were decreased from Example 2 to 0.2% by mass and 0% by mass, respectively; and in these cases, it was confirmed that the apparent porosity was further lowered whereby giving improved effect of the corrosion resistance.

Example 21 is the example in which the phenolic resin having the residual carbon rate of 30% was used as the binder and the amount of the pitch-based raw material was made to 2% by mass; and this example was within the scope of the present invention, so that dense structures could be obtained.

Examples B

In these Examples, the effects of boron carbide addition were investigated. The raw materials were weighed in accordance with the ratios shown in Tables 3 and 4; and the sample was prepared in the same way as Examples A. In addition, the apparent porosity of the obtained sample was measured in the same way as Examples A; and then, the oxidation resistance and the corrosion resistance were evaluated. Meanwhile, the evaluation result of the corrosion resistance is shown by the corrosion resistance index by taking the corrosion amount of Comparative Example 31 shown in Table 3 as 100. In this corrosion resistance index, when the value is larger, it means higher corrosion resistance.

TABLE 3

| Reference Example No. or Example No. (Ref. Ex. No. or Ex. No.) | | Ref. Ex. 31 | Ref. Ex. 32 | Ref. Ex. 33 | Ref. Ex. 34 | Re. Ex. 35 | Ex. 36 | Ex. 37 |
|---|---|---|---|---|---|---|---|---|
| Fused magnesia | More than 1 mm | 36 | 36 | 36 | 36 | 36 | 36 | 26 |
| | 1 to 0.075 mm | 39 | 39 | 39 | 39 | 39 | 43 | 53 |
| | Less than 0.075 mm | 12 | 12 | 12 | 12 | 12 | 8 | 8 |
| Medium-sized particle mass ratio (1 to 0.075 mm) | | 3.25 | 3.25 | 3.25 | 3.25 | 3.25 | 5.38 | 6.63 |
| Flake graphite | | 13 | 13 | 13 | 13 | 13 | 13 | 13 |
| Metal Al | 0.15 mm or less | | | | | | | |
| | 0.075 mm or less | 0.13 | 1 | 1.9 | 1 | 1 | 1 | 1 |
| | 0.045 mm or less | | | | | | | |
| Ratio of metal Al to addition amount of graphite (%) | | 1.0% | 7.7% | 14.6% | 7.7% | 7.7% | 7.7% | 7.7% |
| Metal Si | 0.075 mm or less | | | | | | | |
| | 0.045 mm or less | | | | | | | |
| Ratio of metal Si to addition amount of graphite (%) | | | | | | | | |
| Boron carbide | 0.075 mm or less | | | | | | | |
| | 0.045 mm or less | 0.065 | 0.5 | 0.95 | 0.01 | 0.2 | 0.2 | 0.2 |
| Ratio of boron carbide to addition amount of graphite (%) | | 50.0% | 50.0% | 50.0% | 1.0% | 20.0% | 20.0% | 20.0% |
| Phenolic resin (outer percentage) | Residual carbon rate 42% | ◯ | ◯ | ◯ | ◯ | ◯ | ◯ | ◯ |
| | Residual carbon rate 48% | | | | | | | |
| Apparent porosity (%) | | | | | | | | |
| After heat-treatment at 1400° C. for 3 hours | | 7.7 | 7.2 | 7.4 | 7.6 | 7.0 | 6.9 | 6.8 |
| Oxidation resistance | | | | | | | | |
| Thickness of decarburized layer (mm) | | 11.7 | 10.4 | 9.4 | 11.1 | 10.5 | 10.3 | 10.2 |
| Corrosion resistance | Index | 142 | 148 | 132 | 140 | 153 | 159 | 168 |

TABLE 3-continued

| Example No. (Ex. No.) | | Ex. 38 | Ex. 39 | Ex. 40 | Ex. 41 | Ex. 42 | Ex. 43 | Ex. 44 | Ex. 45 | Ex. 46 | Ex. 47 |
|---|---|---|---|---|---|---|---|---|---|---|---|
| Fused magnesia | More than 1mm | 38 | 34 | 32 | 36 | 36 | 36 | 36 | 36 | 36 | 36 |
| | 1 to 0.075 mm | 46 | 41 | 36 | 43 | 43 | 43 | 43 | 43 | 43 | 43 |
| | Less than 0.075 mm | 8 | 7 | 7 | 8 | 8 | 8 | 8 | 8 | 8 | 8 |
| Medium-sized particle mass ratio (1 to 0.075 mm) | | 5.75 | 5.86 | 5.14 | 5.38 | 5.38 | 5.38 | 5.38 | 5.38 | 5.38 | 5.38 |
| Flake graphite | | 8 | 18 | 25 | 13 | 13 | 13 | 13 | 13 | 13 | 13 |
| Metal Al | 0.15 mm or less | | | | | | | | | | 1 |
| | 0.075 mm or less | 0.6 | 1.4 | 2 | | 1 | 1 | | | | |
| | 0.045 mm or less | | | | 1 | | | 1 | 1 | 1 | 1 |
| Ratio of metal Al to addition amount of graphite (%) | | 7.5% | 7.8% | 8.0% | 7.7% | 7.7% | 7.7% | 7.7% | 7.7% | 7.7% | 7.7% |
| Metal Si | 0.075 mm or less | | | | | 0.2 | | | | | |
| | 0.045 mm or less | | | | | | 0.2 | 0.2 | 0.2 | 0.2 | 0.6 |
| Ratio of metal Si to addition amount of graphite (%) | | | | | | 1.5% | 1.5% | 1.5% | 1.5% | 1.5% | 4.6% |
| Boron carbide | 0.075 mm or less | | | | | | | | | | |
| | 0.045 mm or less | 0.1 | 0.2 | 0.2 | 0.2 | 0.2 | 0.2 | 0.2 | 0.2 | 0.2 | 0.2 |
| Ratio of boron carbide to addition amount of graphite (%) | | 16.7% | 14.3% | 10.0% | 20.0% | 20.0% | 20.0% | 20.0% | 20.0% | 20.0% | 20.0% |
| Phenolic resin (outer percentage) | Residual carbon rate 30% | | | | | | | | | ○ | ○ |
| | Residual carbon rate 42% | ○ | ○ | ○ | ○ | ○ | ○ | ○ | | | |
| | Residual carbon rate 48% | | | | | | | | ○ | | |
| Pitch raw material | | | | | | | | | | | |
| Apparent porosity (%) After heat-treatment at 1400° C. for 3 hours | | 6.3 | 6.9 | 7.3 | 6.7 | 6.7 | 6.5 | 6.2 | 5.4 | 6.6 | 6.3 |
| Oxidation resistance Thickness of decarburized layer (mm) | | 9.9 | 10.7 | 10.8 | 10 | 10.1 | 9.9 | 9.8 | 9 | 10 | 9.7 |
| Corrosion resistance | Index | 161 | 149 | 140 | 163 | 162 | 166 | 165 | 167 | 148 | 135 |

TABLE 4

| Comparative Example No. or Example No. (C. Ex. No. or Ex. No.) | | C. Ex. 31 | C. Ex. 32 | C. Ex. 33 | C. Ex. 34 | C. Ex. 35 | C. Ex. 36 | Ex. 48 |
|---|---|---|---|---|---|---|---|---|
| Fused magnesia | More than 1 mm | 36 | 36 | 36 | 36 | 39 | 31 | 36 |
| | 1 to 0.075 mm | 39 | 39 | 39 | 39 | 46 | 36 | 46 |
| | Less than 0.075 mm | 12 | 12 | 12 | 12 | 8 | 7 | 5 |
| Medium-sized particle mass ratio (1 to 0.075 mm) | | 3.25 | 3.25 | 3.25 | 3.25 | 5.75 | 5.14 | 9.20 |
| Flake graphite | | 13 | 13 | 13 | 13 | 7 | 26 | 13 |
| Metal Al | 0.15 mm or less | | | | | | | |
| | 0.075 mm or less | 0.13 | 1.9 | 1 | 0.13 | 0.54 | 2 | |
| | 0.045 mm or less | | | | | | | |
| Ratio of metal Al to addition amount of graphite (%) | | 1.0% | 14.6% | 7.7% | 1.0% | 7.7% | 7.7% | 7.7% |
| Metal Si | 0.075 mm or less | | | | | | | |
| | 0.045 mm or less | | | | | | | |
| Ratio of metal Si to addition amount of graphite (%) | | | | | | | | |
| Boron carbide | 0.075 mm or less | | | | 0.07 | | | |
| | 0.045 mm or less | | | 0.51 | | 0.11 | 0.4 | 0.2 |
| Ratio of boron carbide to addition amount of graphite (%) | | | | 51.0% | 50.0% | 20.0% | 20.0% | 20.0% |

TABLE 4-continued

| Phenolic resin (outer percentage) | Residual carbon rate 42% | ○ | ○ | ○ | ○ | ○ | ○ | ○ |
|---|---|---|---|---|---|---|---|---|
| | Residual carbon rate 48% | | | | | | | |
| Apparent porosity (%) | | | | | | | | |
| | After heat-treatment at 1400° C. for 3 hours | 7.9 | 7.9 | 9.3 | 7.9 | 7.9 | 8.5 | 7.7 |
| Oxidation resistance | | | | | | | | |
| Thickness of decarburized layer (mm) | | 11.9 | 10.3 | 12.6 | 11.8 | 11.8 | 10.9 | 11.2 |
| Corrosion resistance | Index | 100 | 121 | 95 | 101 | 137 | 96 | 131 |

Reference Examples 31 to 33 and Comparative Examples 31 to 33 show the results of the investigation with regard to the combined effects of boron carbide in the MgO—C brick in which the addition amount of the graphite was made to 13% by mass (this amount refers to the ratio to the total amount of the magnesia raw material and the graphite—the same is applied hereunder) while the addition amount of the metal Al was changed. Reference Example 31 is the case when 0.13% by mass of the metal Al having the particle diameter of 75 μm or less and 0.065% by mass of boron carbide having the particle diameter of 45 μm or less were added; and in this case, the apparent porosity of 7.7% could be achieved thereby giving excellent results in both the oxidation resistance and the corrosion resistance. On the contrary, in Comparative Example 31, because boron carbide was not added, the apparent porosity became higher thereby giving poor results in both the oxidation resistance and the corrosion resistance.

In Reference Examples 32 and 33, the addition amounts of the metal Al were made to 1.0% by mass and 1.9% by mass, respectively, and the addition amounts of boron carbide were made to 0.5% by mass and 0.95% by mass, respectively; in these cases the apparent porosities were lowered furthermore as compared with Reference Example 31 thereby leading to excellent results in the oxidation resistance. On the contrary, in Comparative Example 32, boron carbide was not added, thereby leading to the result of higher apparent porosity as compared with Reference Example 33. In Comparative Example 33, because the addition amount of boron carbide relative to the addition amount of the metal Al was too much, the apparent porosity became higher, and the corrosion resistance was deteriorated.

Reference Example 34 is the case when the addition amount of boron carbide relative to the addition amount of the metal Al was made to 1.0% by mass; here, the apparent porosity of 7.6% could be achieved. Reference Example 35 is the case when the addition amount of boron carbide relative to the addition amount of the metal Al was made to 20% by mass; here, the apparent porosity was further lowered thereby leading to the improvement of both the oxidation resistance and the corrosion resistance.

In Comparative Example 34, the addition amount of boron carbide relative to the addition amount of the metal Al was appropriate; however, because boron carbide was added as comparatively coarse particles having the particle diameter of 75 μm or less (content of the particles having the particle diameter of 45 μm or less was 15% by mass), the apparent porosity became higher.

Examples 36 and 37 show the evaluation results of the cases when the mass ratios of the magnesia raw material having the particle diameter of in the range of 0.075 mm or more and 1 mm or less to the magnesia raw material having the particle diameter of less than 0.075 mm were adjusted at 5.38 and 6.63, respectively; and as a result, the apparent porosities were further lowered and both the oxidation resistance and the corrosion resistance were enhanced.

In Examples 38, 39, and 40, the MgO—C bricks in which the addition amounts of the graphite were made to 8, 18, and 25% by mass, respectively, were studied. All of them showed low apparent porosities, and excellent oxidation resistances and corrosion resistances. On the contrary, in Comparative Example 35, the MgO—C brick in which the addition amount of the graphite was made to 7% by mass was studied; here, the apparent porosity became higher, which was accompanied by deterioration in the oxidation resistance. In Comparative Example 36 in which the addition amount of the graphite was made to 26% by mass, it was also confirmed that the apparent porosity became higher and that the corrosion resistance was deteriorated.

In Example 41, by making the metal Al particles finer, further lower porosity could be achieved. On the contrary, in Example 48 (see Table 4), 1.0% by mass of the comparatively coarse metal Al particles having the particle diameter of 0.15 mm or less was added (content of the particles having the particle diameter of 75 μm or less was 10% by mass); and as a result, poorer results in the oxidation resistance and the corrosion resistance as compared with Examples 36 and 41 were obtained. However, the apparent porosity in Example 48 was 7.7%; and thus, the target of the present invention, i.e., the apparent porosity of 7.8% or less, could be achieved.

In Example 42, the metal Si having the particle diameter of 75 μm or less was combined. It was confirmed that the porosity became lower by combining the metal Si. In Example 43, the metal Si having the particle diameter of 45 μm or less was used, so that further lowered porosity could be achieved.

Example 44 is the case when the finer metal Al to the particle diameter of 45 μm or less was combined with the finer metal Si to the particle diameter of 45 μm or less; here, further lowered porosity could be achieved by combining the finer metals.

In Example 45, the MgO—C brick in which the phenolic resin having the residual carbon rate of 48% was used as the binder was studied. The properties thereof were improved as compared with Example 44 in which the resin having the residual carbon rate of 42% was used.

Examples 46 and 47 are the examples in which the phenolic resin having the residual carbon rate of 30% was used as the binder while the amounts of the pitch-based raw material were made to 1 and 2% by mass, respectively. Both Examples were within the scope of the present invention, so that dense structures could be obtained.

The invention claimed is:

1. A magnesia carbon brick, comprising a magnesia raw material and a graphite, wherein
the magnesia carbon brick contains the graphite with amount thereof in the range of 8% or more by mass and 25% or less by mass and the magnesia raw material with amount thereof in the range of 75% or more by mass and 92% or less by mass, the both amounts being relative to total amount of the magnesia raw material and the graphite;

as a grain size distribution of the magnesia raw material, the magnesia raw material having particle diameter of in the range of 0.075 mm or more and 1 mm or less is blended with amount thereof being 35% or more by mass relative to total amount of the magnesia raw material and the graphite, and a mass ratio of the magnesia raw material having particle diameter of in the range of 0.075 mm or more and 1 mm or less to the magnesia raw material having particle diameter of less than 0.075 mm is 4.2 or more; and an apparent porosity thereof after firing in reducing atmosphere for 3 hours at 1400° C. is 7.8% or less.

2. The magnesia carbon brick according to claim 1, wherein as the grain size distribution of the magnesia raw material, the magnesia raw material having particle diameter of in the range of 0.075 mm or more and 1 mm or less is blended with amount thereof being 43% or more by mass relative to total amount of the magnesia raw material and the graphite, and the mass ratio of the magnesia raw material having particle diameter of in the range of 0.075 mm or more and 1 mm or less to the magnesia raw material having particle diameter of less than 0.075 mm is 4.2 or more.

3. The magnesia carbon brick according to claim 1, wherein as a grain size distribution of the graphite, the graphite having particle diameter of 0.15 mm or more is blended with amount thereof being 40% or more by mass relative to total amount of the graphite.

4. The magnesia carbon brick according to claim 1, wherein amount of a pitch-based raw material is less than 1% by mass in outer percentage relative to total amount of the magnesia raw material and the graphite.

5. The magnesia carbon brick according to claim 1, wherein the magnesia carbon brick contains a metal Al containing 85% or more by mass of particles having particle diameter of 75 μm or less with amount thereof in the range of 1% or more by mass and 15% or less by mass relative to addition amount of the graphite, and boron carbide containing 85% or more by mass of particles having particle diameter of 45 μm or less with amount thereof in the range of 1% or more by mass and 50% or less by mass relative to addition amount of the metal Al.

6. The magnesia carbon brick according to claim 2, wherein as a grain size distribution of the graphite, the graphite having particle diameter of 0.15 mm or more is blended with amount thereof being 40% or more by mass relative to total amount of the graphite.

7. The magnesia carbon brick according to claim 6, wherein amount of a pitch-based raw material is less than 1% by mass in outer percentage relative to total amount of the magnesia raw material and the graphite.

8. The magnesia carbon brick according to claim 7, wherein the magnesia carbon brick contains a metal Al containing 85% or more by mass of particles having particle diameter of 75 μm or less with amount thereof in the range of 1% or more by mass and 15% or less by mass relative to addition amount of the graphite, and boron carbide containing 85% or more by mass of particles having particle diameter of 45 μm or less with amount thereof in the range of 1% or more by mass and 50% or less by mass relative to addition amount of the metal Al.

9. The magnesia carbon brick according to claim 2, wherein amount of a pitch-based raw material is less than 1% by mass in outer percentage relative to total amount of the magnesia raw material and the graphite.

10. The magnesia carbon brick according to claim 2, wherein the magnesia carbon brick contains a metal Al containing 85% or more by mass of particles having particle diameter of 75 μm or less with amount thereof in the range of 1% or more by mass and 15% or less by mass relative to addition amount of the graphite, and boron carbide containing 85% or more by mass of particles having particle diameter of 45 μm or less with amount thereof in the range of 1% or more by mass and 50% or less by mass relative to addition amount of the metal Al.

11. The magnesia carbon brick according to claim 3, wherein amount of a pitch-based raw material is less than 1% by mass in outer percentage relative to total amount of the magnesia raw material and the graphite.

12. The magnesia carbon brick according to claim 11, wherein the magnesia carbon brick contains a metal Al containing 85% or more by mass of particles having particle diameter of 75 μm or less with amount thereof in the range of 1% or more by mass and 15% or less by mass relative to addition amount of the graphite, and boron carbide containing 85% or more by mass of particles having particle diameter of 45 μm or less with amount thereof in the range of 1% or more by mass and 50% or less by mass relative to addition amount of the metal Al.

13. The magnesia carbon brick according to claim 3, wherein the magnesia carbon brick contains a metal Al containing 85% or more by mass of particles having particle diameter of 75 μm or less with amount thereof in the range of 1% or more by mass and 15% or less by mass relative to addition amount of the graphite, and boron carbide containing 85% or more by mass of particles having particle diameter of 45 μm or less with amount thereof in the range of 1% or more by mass and 50% or less by mass relative to addition amount of the metal Al.

14. The magnesia carbon brick according to claim 4, wherein the magnesia carbon brick contains a metal Al containing 85% or more by mass of particles having particle diameter of 75 μm or less with amount thereof in the range of 1% or more by mass and 15% or less by mass relative to addition amount of the graphite, and boron carbide containing 85% or more by mass of particles having particle diameter of 45 μm or less with amount thereof in the range of 1% or more by mass and 50% or less by mass relative to addition amount of the metal Al.

* * * * *